United States Patent
Schneider et al.

(10) Patent No.: US 12,556,229 B2
(45) Date of Patent: Feb. 17, 2026

(54) SYSTEM WITH MULTIPLE NFC-CHIPS

(71) Applicant: Infineon Technologies AG, Neubiberg (DE)

(72) Inventors: Matthias Schneider, Kirchheim (DE); Qi Zhu, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 350 days.

(21) Appl. No.: 18/134,278

(22) Filed: Apr. 13, 2023

(65) Prior Publication Data

US 2023/0361813 A1 Nov. 9, 2023

(30) Foreign Application Priority Data

May 6, 2022 (EP) .................................... 22172119

(51) Int. Cl.
| | |
|---|---|
| *H04B 5/00* | (2024.01) |
| *H04B 5/24* | (2024.01) |
| *H04B 5/26* | (2024.01) |
| *H04B 5/45* | (2024.01) |
| *H04B 5/79* | (2024.01) |
| *H04B 5/70* | (2024.01) |

(52) U.S. Cl.
CPC ............... *H04B 5/24* (2024.01); *H04B 5/266* (2024.01); *H04B 5/45* (2024.01); *H04B 5/79* (2024.01); *H04B 5/70* (2024.01)

(58) Field of Classification Search
CPC ... H04B 5/24; H04B 5/79; H04B 5/45; H04B 5/70; H04B 5/266; H04B 5/02
See application file for complete search history.

(56) References Cited

U.S. PATENT DOCUMENTS

| | | | |
|---|---|---|---|
| 2013/0244578 A1* | 9/2013 | Bacioccola | H04M 1/72415 455/41.2 |
| 2014/0148095 A1 | 5/2014 | Smith et al. | |
| 2015/0118956 A1* | 4/2015 | Desai | H04B 5/24 455/41.1 |
| 2015/0295418 A1* | 10/2015 | Ren | H02J 7/0047 307/104 |
| 2023/0361813 A1* | 11/2023 | Schneider | H04B 5/24 |

FOREIGN PATENT DOCUMENTS

| | | |
|---|---|---|
| EP | 3001533 A1 | 3/2016 |
| WO | 2017079097 A1 | 5/2017 |

OTHER PUBLICATIONS

Extended European Search Report, EP 22 172 119.4, Nov. 2, 2022, pp. 1-9.

\* cited by examiner

*Primary Examiner* — Md K Talukder
(74) *Attorney, Agent, or Firm* — Armis IP Law, LLC

(57) ABSTRACT

An NFC device is described herein. According to one exemplary embodiment, the NFC device includes a first NFC antenna and a second NFC antenna, which are inductively coupled to each other (and, during operation, also to the antenna of a further NFC device). The NFC device further includes a first NFC circuit coupled to the first antenna via a first matching network and a second NFC circuit coupled to the second antenna via a second matching network. Furthermore, the NFC device includes a first detuning circuit coupled to the first antenna and configured to, when activated, detune a first resonant circuit formed by the first antenna, the first matching circuit and the first detuning circuit.

24 Claims, 6 Drawing Sheets

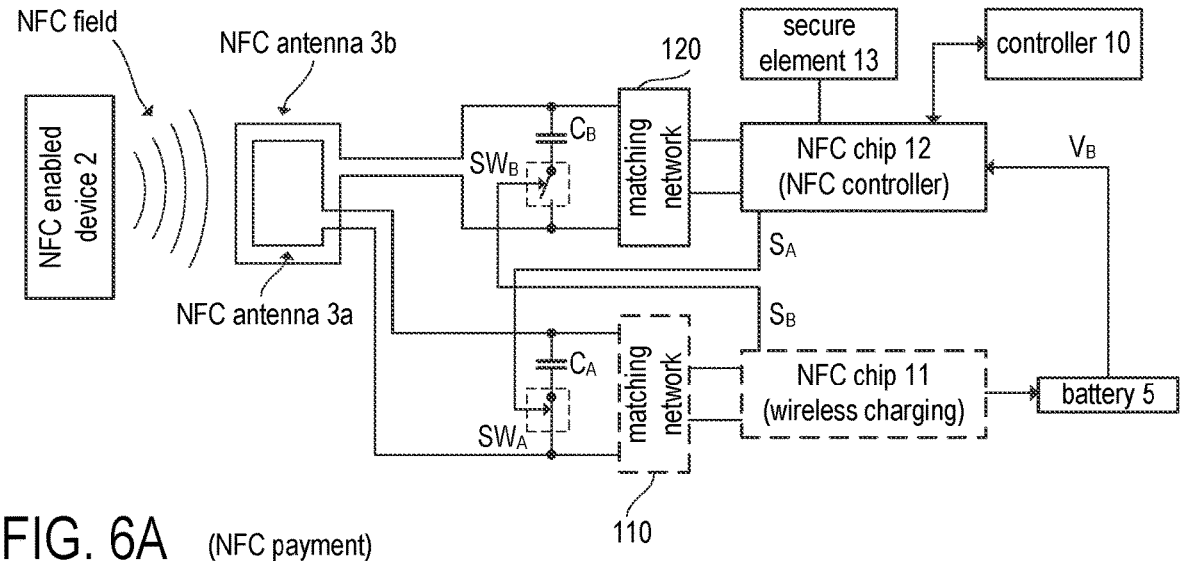
FIG. 6A (NFC payment)
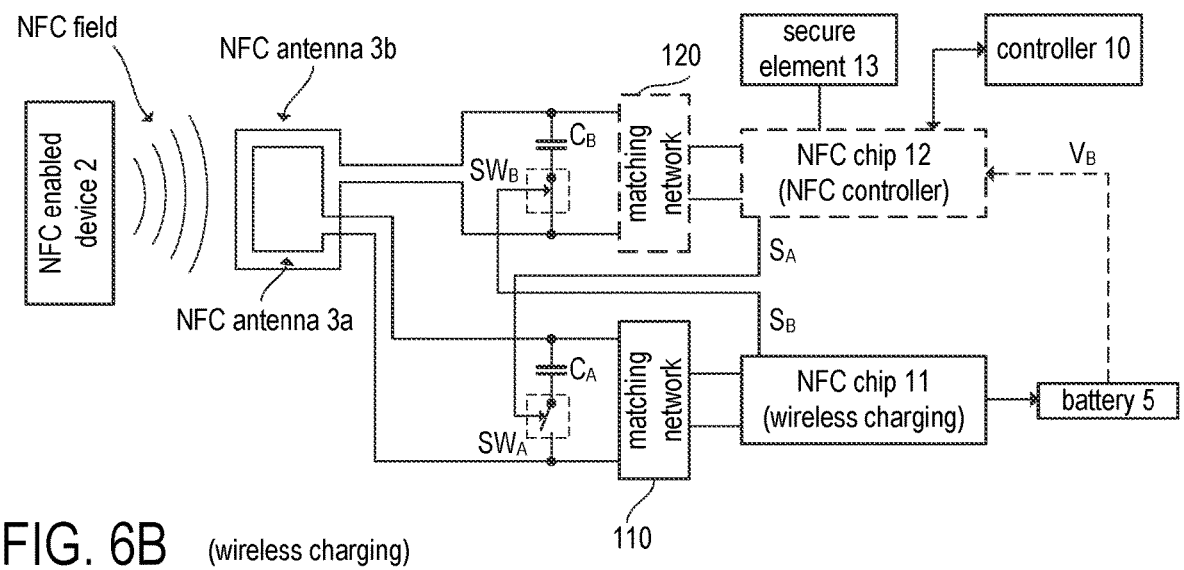
FIG. 6B (wireless charging)

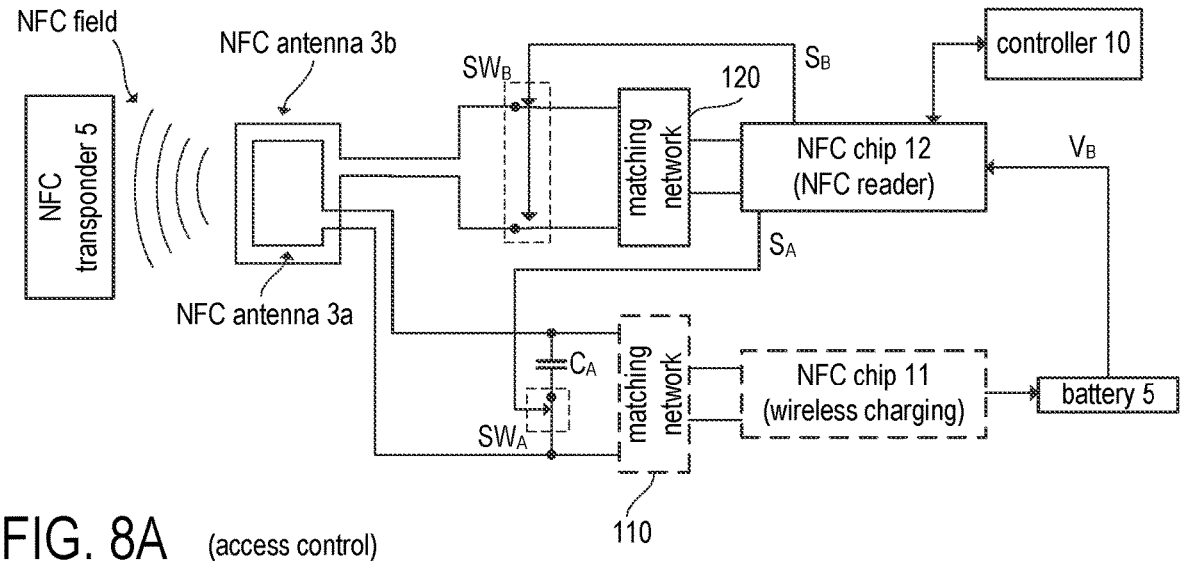
FIG. 8A (access control)
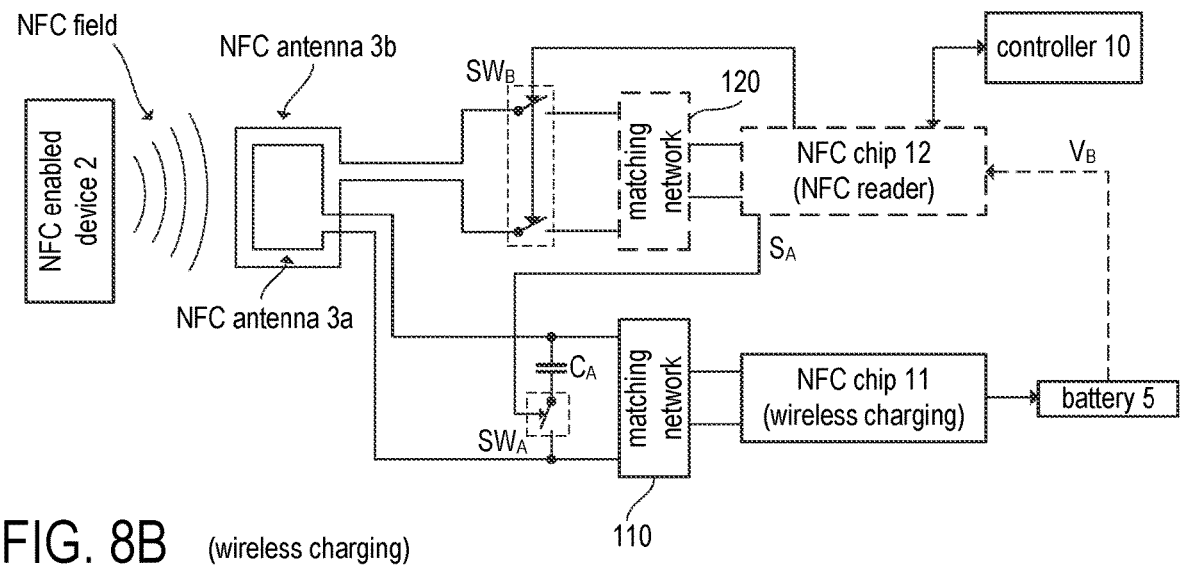
FIG. 8B (wireless charging)

SYSTEM WITH MULTIPLE NFC-CHIPS

RELATED APPLICATION

This application claims priority to earlier filed European Patent Application Serial Number EP22172119 entitled "SYSTEM WITH MULTIPLE NFC-CHIPS," filed on May 6, 2022, the entire teachings of which are incorporated herein by this reference.

TECHNICAL FIELD

The present disclosure relates to the field of Near Field Communication (NFC) and particularly to circuits, methods, and devices used in connection with Near Field Communication (NFC).

BACKGROUND

Near Field Communication (NFC) denotes a standardized data transmission technique for the contactless exchange of data across relatively short distances (e.g. a few centimeters) using electromagnetically coupled inductors. NFC is based on the well-known RFID technique and allows data rates of several hundred kBits/s. Currently NFC is commonly used in the field of "Micropayment" (non-cash payments of small amounts) as well as in the field of access control. Further applications include, for example, the transmission of authentication data in the process of establishing a communication link via, for example, Bluetooth, Wireless LAN or the like. Recently sensor applications have been developed which allow retrieving measured data, e.g. by a mobile device, using NFC. NFC is standardized in ISO/IEC 18092 (Near Field Communication Interface and Protocol-1) and ISO/IEC 21481 (Near Field Communication Interface and Protocol-2).

In order to perform the mentioned payment functions, many mobile devices such as smart phones are equipped with NFC transceivers. Such devices are usually referred to as NFC enabled devices or NFC readers. Their counterparts are often referred to as NFC tags or NFC transponders. NFC transponders usually do not have their own energy supply and source the electrical energy required for their operation from the electromagnetic field used for NFC (NFC field). The NFC field is usually generated by the NFC reader (e.g. a smart phone). That is, energy is transferred via the NFC field from the NFC reader to an NFC transponder, whereas data transmission is possible in both directions. Most of the circuitry of an NFC transponder required to implement Near Field Communication is integrated in a single chip.

In many applications NFC readers can also emulate an NFC tag. That is, an NFC reader can behave like a passive NFC transponder communicating with another NFC reader. In such cases, the NFC reader is also referred to as NFC controller. An NFC tag can be implemented, by an NFC reader/controller, using a so-called secure element (which is a piece of hardware) or by a software application executed by a controller. So-called smart cards such as bank cards (credit card, debit card), ID cards, insurance cards or the like may also be emulated by software, which is also known as Host Card Emulation (HCE). HCE is a basically a piece of software that represents a virtual copy of the smart card. For example, NFC data transfers for payments are mainly realized via a so-called "secure element" stored in the operating system of the (NFC enabled) mobile device. This allows to implement, for example, mobile applications for payment services independently of third parties, i.e. without the need for the usual physical smart card.

The antennas of NFC readers and NFC tags/transponders are usually simple conductor loops which can be formed, e.g., on a printed circuit board (PCB). In antenna circuits such conductor loops represent respective inductors which form, in connection with corresponding capacitors, resonant circuits. For an efficient energy transfer from an NFC enabled device to an NFC transponder, the corresponding antenna circuits are usually operated at the same resonance frequency, which results in a maximum electromagnetic coupling. As a consequence, the voltage induced in the antenna of the NFC transponder is at its maximum. In standard applications, the resonance frequency is usually at 13.56 MHz. The NFC chip of an NFC transponder is usually configured to generate its own supply voltage from the NFC field. However, there are also transponders with their own supply (e.g. provided by a battery).

Recently (October 2021), the NFC Forum, which promotes standardization of NFC technologies, released the Wireless Charging (WLC) specification 2.0. WLC 2.0 has been designed to make it easier and more convenient to charge devices such as, for examples, wearables (e.g. earbuds, smartwatches, fitness trackers, etc.), headsets, smart locks and other products. Such products may include more than one NFC tag (or one NFC reader and at least one NFC tag), wherein one NFC tag may be coupled to a battery to charge the battery using WLC technology. However, once more than two NFC chips (reader and two or more tags) are inductively coupled (i.e. share the same physical communication channel), a communication between two particular NFC chips (reader and tag) may be disturbed by one of the other NFC chips. A more specific problem may arise when one NFC chip is activated for wireless charging. The relatively high signal levels received by an NFC antenna may be harmful for other NFC devices not designed for wireless charging.

The inventors have identified a need for improvement of NFC techniques in order to allow more than two NFC chips which share the same physical communication channel and are thus inductively coupled.

SUMMARY

The problem indicated above is solved by the NFC device of claim 1 as well as the methods of claims 12 and 16. Various embodiments and further developments are covered by the dependent claims.

An NFC device is described herein. According to one exemplary embodiment, the NFC device includes a first NFC antenna and a second NFC antenna, which are inductively coupled to each other (and, during operation, also to the antenna of a further NFC device). The NFC device further includes a first NFC circuit coupled to the first antenna via a first matching network and a second NFC circuit coupled to the second antenna via a second matching network. Furthermore, the NFC device includes a first detuning circuit coupled to the first antenna and configured to, when activated, detune a first resonant circuit including the first antenna and the first matching circuit.

Furthermore, a method for a NFC device is described herein. In accordance with one exemplary embodiment the method includes the detuning of a first resonant circuit including a first antenna and a first matching network of an NFC device, wherein the first antenna is coupled to the first matching network and a first NFC circuit of the NFC device. The method further includes receiving data—by a second NFC circuit of the NFC device and from a further NFC device—via a second antenna coupled to a second matching network and the second NFC circuit, wherein the first antenna and the second antenna are inductively coupled to each. The detuning of the first resonant circuit is stopped dependent on the received data.

In accordance with a further exemplary embodiment the method includes the detuning of a first resonant circuit including a first antenna and a first matching network of an NFC device, wherein the first antenna is coupled to the first matching network and a first NFC circuit of the NFC device. The method further includes receiving data—by a second NFC circuit of the NFC device and from a further NFC device—via a second antenna coupled to a second matching network and the second NFC circuit, wherein the first antenna and the second antenna are inductively coupled to each. The detuning of the first resonant circuit is stopped when a supply voltage of the NFC device falls below a threshold value.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings:

FIG. 1 illustrates the coupling of an NFC chip/transponder to an NFC enabled device (including an NFC reader) such as a smart phone or the like.

FIGS. 6A and 6B (collectively FIG. 6) illustrate the use of the circuit arrangement of FIG. 5 in a NFC payment application.

FIGS. 8A and 8B (collectively FIG. 8) illustrate the use of the circuit arrangement of FIG. 4 in an access control application.

DETAILED DESCRIPTION

Figure 1:
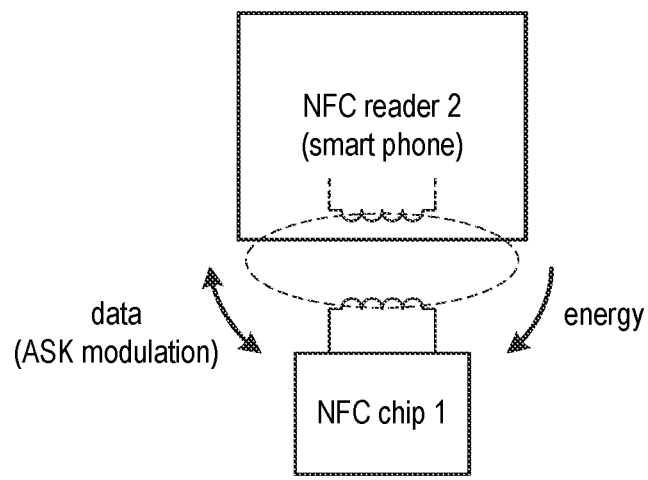

As mentioned above, Near Field Communication (NFC) is a standardized technique for energy and data transmission between an NFC enabled device 2 (including an NFC reader) such as, for example, a tablet computer, a smart phone or any other mobile device, and an NFC circuit 1 (e.g. integrated in an NFC chip), which may function as NFC tag/transponder, RFID tag or simply as an NFC communication interface that allows further circuits (e.g. a sensor circuit) to communicate with the NFC reader 2. This situation is illustrated in FIG. 1. Usually, NFC is not only used for (e.g. bidirectional) data transmission but also for the (unidirectional) transmission of energy from the NFC reader 2 to the NFC chip 1. Therefore, NFC chip 1 may also be used to charge a battery using the NFC wireless charging (WLC) technique, wherein the energy received by the NFC antenna is used to charge the battery. The antennas of the NFC chip 1 and the NFC reader 2 are usually implemented using conductor loops (i.e. flat coils), and the data transmission, as well as the energy transmission, are based on the inductive coupling of the two antennas.

NFC chips may be employed in various applications. For example, NFC may be used for authentication, in payment systems, access control systems, smart locks or the like. Recently, NFC also began to be used in more complex applications such as, for example, sensor applications, to provide a communication link between sensor electronics (e.g. included in the NFC chip 1) and an NFC enabled device, which can then be used for the digital post processing and/or for the display, on a screen of the NFC enabled device (e.g. a smart phone or tablet PC), of the measured data provided by the sensor electronics.

Applications in which authentication data is to be transmitted by the transponder can basically be implemented with little complexity and such applications require only a comparably low amount of power for operation. Further, the NFC chip (transponder) only needs to be active for a relatively short time. More complex applications may include electronic circuits that consume more power for longer time periods as compared to normal NFC transponders. In such applications, the NFC transponders may need a separate power supply such as a battery, as the NFC field generated by the NFC reader is not able to transmit enough energy to reliably operate the NFC transponder. To recharge the battery, the NFC WLC technology may be used, which usually requires a dedicated NFC chip which is capable of energy harvesting in accordance with the NFC WLC standard.

The examples described herein relate to a situation, in which one device includes two NFC chips, wherein one of the NFC chips is used for wireless charging and the other one of the NFC chips is used to implement an NFC reader or an NFC tag. As mentioned, an NFC reader (NFC controller) may be operated to emulate an NFC tag. This device (which includes two NFC chips) can communicate with another NFC enabled device or NFC tag. This situation is illustrated in FIG. 2 and further explained below.

Figure 2:
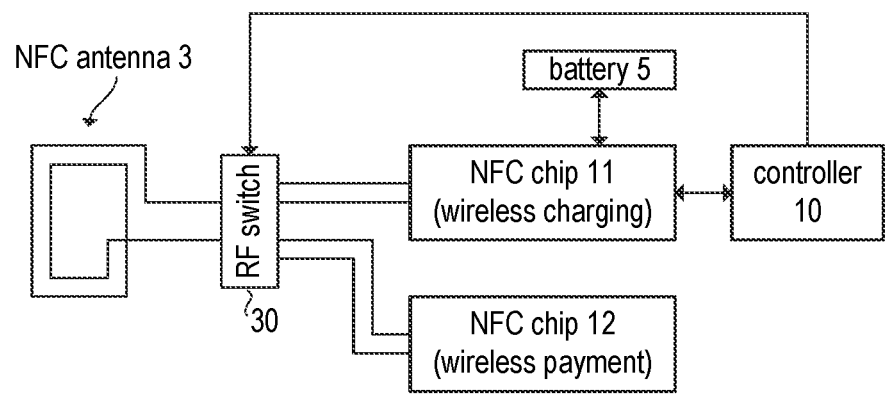
FIG. 2 illustrates one example of a circuit arrangement with two NFC chips sharing one NFC antenna within one device.

The circuit shown in FIG. 2 represents a system including two NFC circuits 11 and 12 (e.g. integrated into two NFC chips) which share one NFC antenna 3. That is, the first NFC chip 11 and the second NFC chip 12 are coupled to the NFC antenna 3 via an RF switch 30. The acronym RF stands for "radio frequency", wherein current NFC systems use 13.56 MHz signals. In the present example, the first NFC chip 11 is configured to be used for wireless charging of the battery 5, and the second NFC chip 12 is an NFC tag configured to be used for wireless payment. The controller 10 is configured, inter alia, to connect the NFC antenna 3 with either the second NFC chip 12 or the first NFC chip 11.

It is understood that the circuit of FIG. 2 is a simplification and various components which are not relevant for the present discussion have been omitted. For example. Matching circuits, which are used for impedance matching, and coupled between the NFC antenna and the NFC chips are not shown in FIG. 3. It may be assumed that the matching circuits are included in the NFC chips 11 and 12. Further, the charging electronics (battery charger) used for controlling the charging process of the battery 5 is not shown in FIG. 2. Also not shown in FIG. 2 is the NFC enabled device which can communicate with either the NFC chip 11 or the NFC chip 12. The concept illustrated in FIG. 2 allows the NFC chips 11 and 12 to share one antenna but requires the RF switch 30. To connect the NFC antenna 3 with one of the NFC chips, the RF chip 30 needs a voltage supply provided by the battery 5. In a situation, in which the battery 5 is discharged and not able to provide a sufficient voltage to operate the RF switch 30, the RF switch 30 is inoperative, and, as a consequence, NFC and wireless charging cannot be used.

Figure 3:
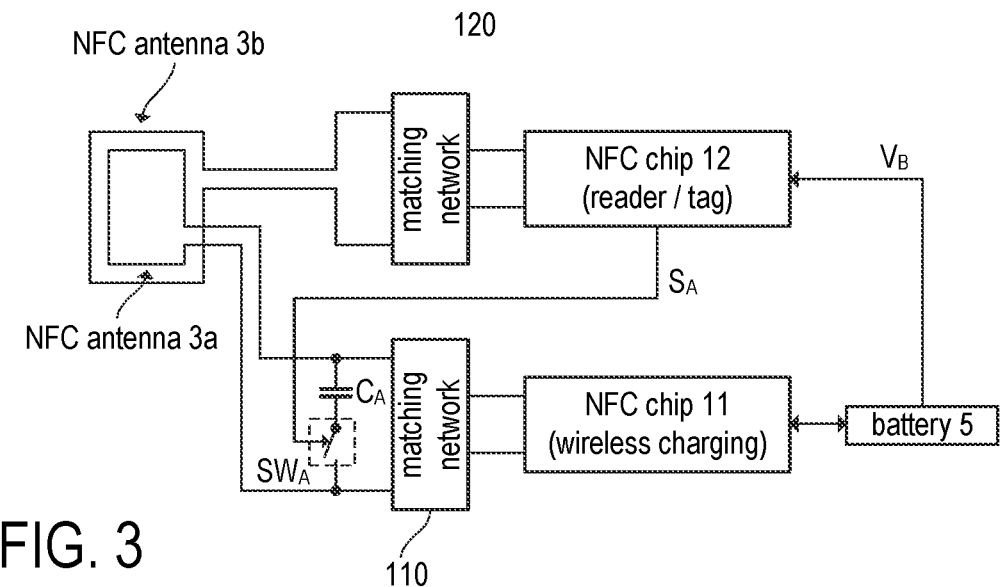
FIG. 3 illustrates an alternative example of a circuit arrangement with two NFC chips and two respective NFC antennas that are inductively coupled within one device, wherein one NFC chip is capable of detuning the antenna/matching network combination of the other NFC chip to avoid interfering communication across an NFC communication channel when communicating with another device.

FIG. 3 illustrates, by way of example, another concept which allows to combine two or more NFC chips in one system/device while avoiding the need for an RF switch. Different from the previous example, the circuit of FIG. 3 has two NFC antennas 3a and 3b, wherein antenna 3a is coupled with NFC circuit 11 via a matching circuit 110 and antenna 3b is coupled with NFC circuit 12 via a matching circuit 120. As mentioned above, the matching circuits may also be included in the NFC chips but are depicted, in FIG. 3, as separate component as the matching circuits are relevant for the further discussion. The NFC circuits 11 and 12 may include an NFC transceiver and be integrated in respective NFC chips.

The two antennas 3a and 3b are inductively coupled. They may be implemented as (e.g. at least partly overlapping) flat coils in different wiring layers of a printed circuit board (PCB). Alternatively, they may be implemented in the same wiring layer adjacent to each other. The matching circuits 110 and 120 may include a passive impedance adjustment network composed of a plurality of capacitances and, optionally, a filter network (to eliminate electromagnetic interferences, EMI) which may be a passive LC low-pass filter composed of capacitors and inductances. The matching circuits 110 and 120 are usually designed such that— together with the respective antennas 3a, 3b— form resonant circuits whose resonant frequency matches at least approximately the oscillation frequency of the NFC field, which is 13.56 MHz in many applications. However, the resonant circuits may include further elements such as resistor for the purpose of damping.

According to FIG. 3, a capacitor $C_A$ may be connected to the matching circuit 110 (also referred to as matching network) using an electronic switch $SW_A$ such that the capacitor $C_A$ is connected in parallel to the antenna 3a when the electronic switch $SW_A$ is closed (capacitor $C_A$ active). Accordingly, the capacitor $C_A$ is disconnected from the matching network 110 when the electronic switch $SW_A$ is open (capacitor $C_A$ inactive). The capacitor $C_A$ can also be regarded as part of the matching circuit 110, wherein—while active—the capacitor $C_A$ has the effect that the resonant circuit formed by antenna 3a, matching circuit 110 and capacitor $C_A$ is detuned by activating the capacitor $C_A$ (i.e. by closing the switch $SW_A$). For example, the resonance frequency may be shifted from 13.56 MHz (capacitor $C_A$ inactive, switch $SW_A$ open) to, e.g. 25 MHz (capacitor $C_A$ active, switch $SW_A$ closed) with the effect that the NFC circuit/chip 11 cannot receive data via the NFC antenna 3a and is practically decoupled from the NFC antenna 3a and thus from the NFC communication channel.

Generally, the capacitor $C_A$ and the electronic switch $SW_A$ can be regarded as a detuning circuit, which can be activated and deactivated by a control signal SA that controls the state of the switch $SW_A$. Dependent on the actual implementation, the detuning circuit may be more complex than in the example of FIG. 3 and include further passive electronic components such as capacitors, inductors, and resistors. Also the switch $SW_A$ may include more than one switching element that may be implemented as, for example, transistors. The detuning circuit is coupled to the antenna 3a and configured to, when activated, detune a resonance frequency of a resonant circuit formed by the antenna 3a, the respective matching circuit 110 and the detuning circuit (formed by $C_A$, and $SW_A$ in the example of FIG. 3).

As shown in FIG. 3, the electronic switch $SW_A$ can be closed/opened, by the NFC chip 12, to activate/deactivate the capacitor $C_A$. Accordingly, the NFC circuit/chip 12, which is coupled to the antenna 3b via the matching circuit 120, is capable of detuning the other matching circuit 110, which is arranged between antenna 3a and NFC chip 11. In the present example, the NFC chip 12 needs a supply voltage $V_B$ provided by battery 5 to operate. As long as the battery 5 is able to provide a sufficiently high supply voltage $V_B$ (i.e. a supply voltage $V_B$ above a threshold that corresponds to a minimum supply voltage), the NFC chip 12 can detune the matching circuit 110 of NFC chip 11 (by closing switch $SW_A$), and therefore can use the NFC antenna 3b to communicate with an NFC enabled device (not shown in FIG. 3), wherein the NFC chip 11 is not able to interfere due to the detuned matching circuit 110. Accordingly, the NFC chip 12 may provide the desired function, e.g. operate as NFC reader or as NFC tag, as long as the battery 5 provides the required supply voltage $V_B$.

In a situation, in which the battery 5 does not provide the required supply voltage $V_B$, the switch $SW_A$ is open/inactive and, consequently, the matching circuit 110 is not detuned anymore. As a consequence, the NFC chip 11 is able to communicate with an external NFC enabled device (not shown in FIG. 3) using antenna 3a. In the present example, the NFC chip 11 is used for the wireless charging of the battery 5. In the present example, an empty battery leads to an activation of the NFC chip 11 (because the respective matching circuit 110 cannot be detuned anymore) thus allowing wireless charging, whereas in the previous example of FIG. 2 an empty battery makes the device inoperative as the RF switch 30 disconnects the shared antenna from both NFC chips.

It should be noted, at this point, that FIG. 3 is merely one illustrative example of the concept of deactivating the matching circuit of an NFC chip in order to prevent this NFC chip to disturb the communication between another NFC chip and an external NFC enabled device or NFC tag. Furthermore, the entity, which controls the switch $SW_A$, is not necessarily the NFC chip 12. Dependent on the application, any other entity (e.g. a control circuit, a battery monitoring circuit, etc.) may control the switch $SW_A$ and thus detune the matching circuit 110. Irrespective of which entity controls the switch $SW_A$, a loss of voltage supply (e.g. from the battery) will result in the matching circuit 110 being tuned, so that NFC chip 11 is be able to communicate with an external NFC enabled device (cf. device 2 in FIG. 1, not shown in FIG. 3), wherein the NFC chip 11 is able to generate its own supply voltage from the electromagnetic power of the NFC field generated by the external NFC enabled device. As discussed above, this voltage supply (generated from the NFC field) may be used to recharge the battery 5.

In the example of FIG. 3, the NFC chip 12 is inactive if the battery 5 does not provide a sufficient supply voltage. For example, the NFC chip 12 may be an NFC reader or an NFC tag, which may be emulated by an NFC reader. However, the NFC chip 12 may also be a conventional NFC transponder which generates its own supply from an NFC field generated by an external NFC enabled device. In a situation, in which the battery 5 is empty, the matching circuit 110 is not detuned (because switch $SW_A$ is open due to a lack of supply), and the NFC chip 11 receives energy (via antenna 3a) to recharge the battery, the signal level received by the antenna 3b may be too high and exceed the absolute maximum rating of NFC chip 12. This is particularly the case when the NFC chip 12 is a "normal" NFC device not capable of wireless charging and handling higher antenna signal power. To protect the input of NFC chip 12, a switch $SW_B$ may be arranged between the antenna 3b and the NFC chip 12 as shown in the example of FIG. 4.

Figure 4:
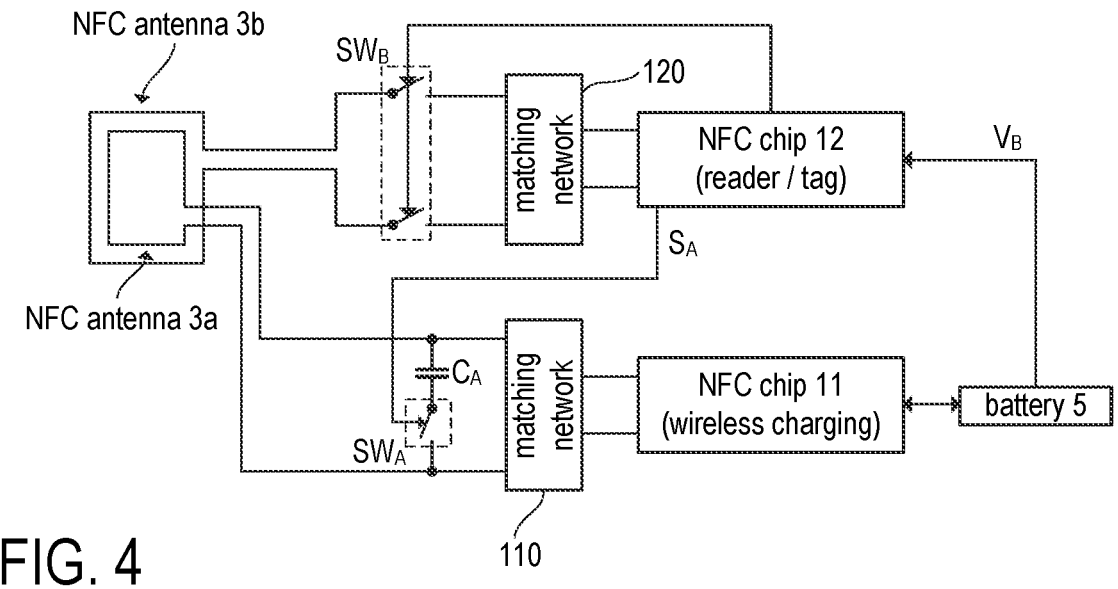
FIG. 4 illustrates a modification of the example of FIG. 3.

The example of FIG. 4 is basically the same as the example of FIG. 3, wherein the only additional component in FIG. 4 is the switch $SW_B$ which is configured to connect and disconnect the antenna 3b from the NFC chip 12. In the present example, the switch $SW_B$ is controlled by the NFC chip 12. However, it may be controlled by a different entity (e.g. a control circuit, a battery monitoring circuit, etc.) in other implementations. As long as the battery 5 is able to provide a sufficiently high supply voltage $V_B$, the switches are $SW_A$ and $SW_B$ are closed. As a consequence, the antenna 3b is connected to the matching network 120 and thus to the NFC chip 12, whereas the matching network 110 is detuned as explained above. When the battery 5 is not able to provide a sufficiently high supply voltage $V_B$, the switches are $SW_A$ and $SW_B$ are open (which is their default state). As a consequence, the antenna 3b is disconnected from the matching network 120 and NFC chip 12, and the matching network 110 is not detuned anymore, thus allowing the NFC chip 11 to provide energy for the recharging of the battery 5 using WLC technology. During wireless charging, the NFC chip 12 is protected from high signal levels by the (open) switch $SW_B$.

Figure 5:
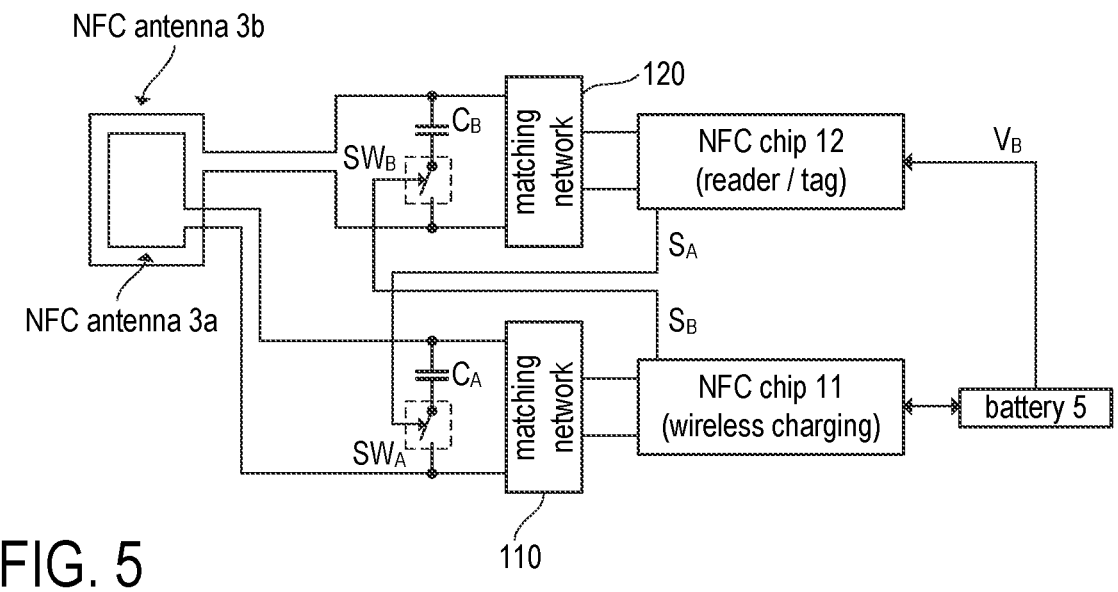
FIG. 5 illustrates an alternative modification of the example of FIG. 3

FIG. 5 illustrates an alternative to the example of FIG. 4. The circuits of FIGS. 4 and 5 are the same except that the antenna 3b is not disconnected from the NFC chip 12 using a switch, but instead the antenna 3b (to be precise: the resonant circuit formed by antenna and matching circuit) is detuned by connecting a capacitor $C_B$ in parallel to the antenna 3b by closing the switch $SW_B$. Capacitor $C_B$ and switch $SW_B$ form a detuning circuit in the same way as explained above with reference to capacitor $C_A$ and switch $SW_A$. The switch $SW_B$ is closed to detune the antenna 3a when the NFC chip 11 is active, e.g. to harvest energy for recharging the battery 5. The detuning of the antenna 3a can be done in the same way as explained above with reference to FIG. 4.

The function and operation of the circuit arrangement of FIG. 5 is further discussed with reference to FIGS. 6A and 6B which illustrate how the circuit arrangement of FIG. 5 may be used in a wireless payment application. For this purpose, the circuit arrangement may be included in a wearable device such as a fitness tracker, a smart watch or the like. According to FIG. 6 (6A and 6B) the NFC chip 12 is an NFC controller connected to a secure element 13 and a controller 10 (host controller). In the situation shown in FIG. 6A, the NFC chip 12 controls the switch $SW_A$ to detune the antenna 3a of NFC chip 11, which practically deactivates the NFC chip 11 (which therefore does not detune the antenna 3b). The NFC enabled device 2 may be a payment terminal, which includes a conventional NFC reader configured for the processing of NFC payment. With the help of the secure element, the NFC chip 12 (NFC controller) emulates an NFC tag as it may also be included in credit cards or the like. The operation of the NFC chip 12 may be controlled by the host controller 10.

FIG. 6B shows a situation, in which the NFC chip 12 is inactive and does not detune the antenna 3a of NFC chip 11, which therefore may be used to (re-) charge the battery 5. The NFC chip 12 may be inactive, for example, due to a low supply voltage $V_B$ caused by a low state of charge (SoC) of the battery 5. In this situation, the NFC chip 11 receives (harvests) energy provided by the NFC field which is generated by the NFC enabled device. This energy may be used to charge the battery 5 in accordance with the NFC WLC standard.

A low supply voltage $V_B$ is not the only situation, in which wireless charging can be used. When the NFC chip 12 is active (as illustrated in FIG. 6A) and receives a charging request instead of a payment request, the NFC chip 12 may transition into a quiet mode and stop detuning the NFC chip 11 thus allowing wireless charging in the same way as it is the case when the battery 5 is empty. The process is further illustrated by the flow chart of FIG. 7.

Figure 7:
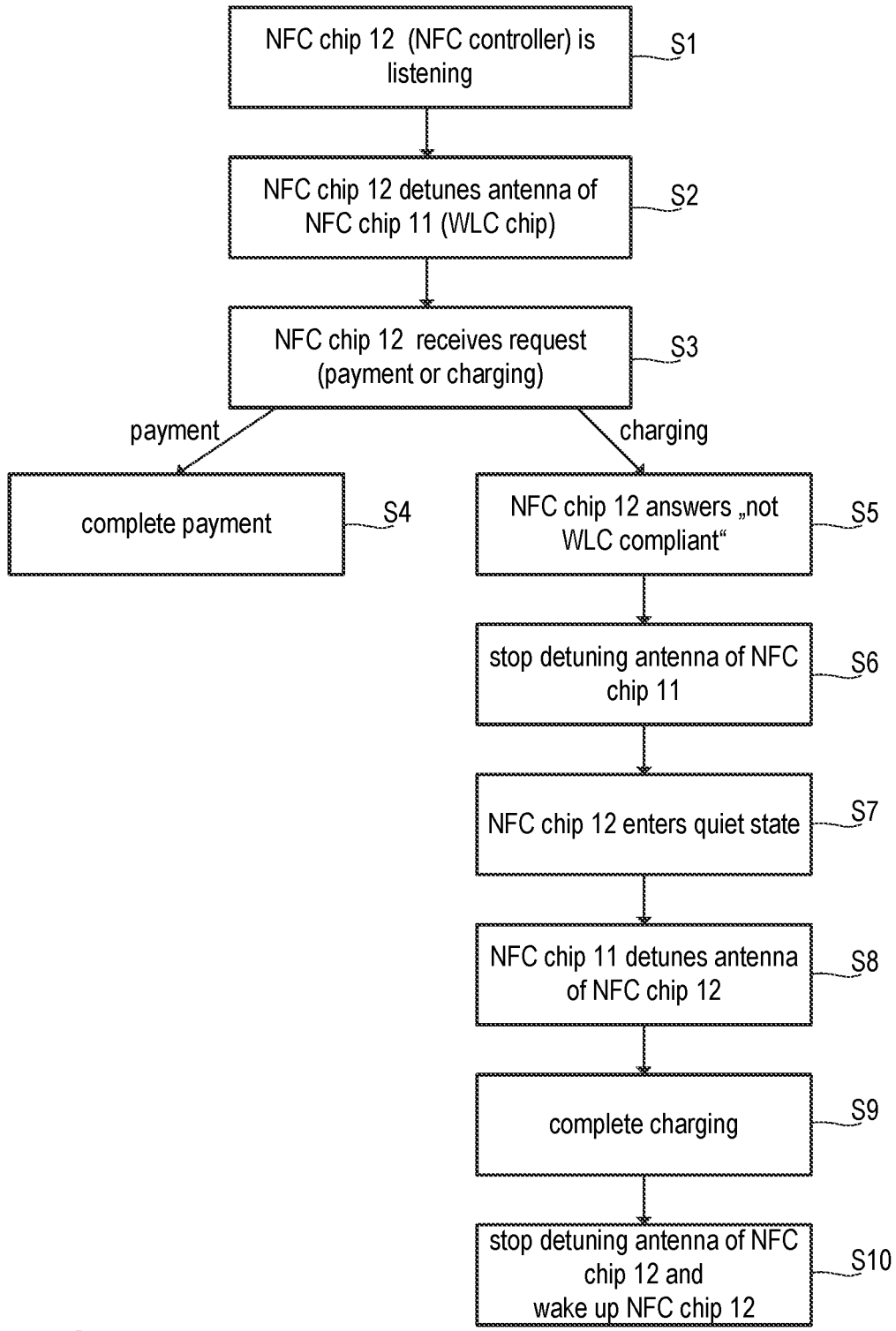
FIG. 7 is a flow chart illustrating one exemplary method combining NFC payment and wireless charging in one device.

The example of FIG. 7 starts with the NFC chip 12 being active and listening (see FIG. 7, reference sign S1). In this mode of operation, the NFC chip 12 detunes (see FIG. 7, ref. sign S2) the antenna 3a of the NFC chip 11 as shown in FIG. 6A. In the following, the NFC chip 12 receives a request (see FIG. 7, ref. sign S3), which may be either a payment request or a charging request). At this point the NFC chip 11 is not able to interfere with the communication as its antenna is detuned. If the received request is a payment request, the payment process is completed (see FIG. 7, ref. sign S4). The payment process is as such known and thus not further discussed herein.

If the received request is a charging request, the NFC chip 12 responds with a message indicating—to the NFC enabled device which sent the request—that WLC is not available ("not WLC compliant" message, see FIG. 7, ref. sign S5), stops detuning the antenna 3a of NFC chip 11 (see FIG. 7, ref. sign S6), and enters a quiet mode, in which any communication on the NFC channel is ignored (see FIG. 7, ref. sign S7). As antenna 3a is not detuned anymore, the NFC chip 11 can become active, detune the antenna 3b of NFC chip 12 (optional, see FIG. 7, ref. sign S8), and complete the charging process (see FIG. 7, ref. sign S9). The WLC process is as such known and thus not further discussed herein. Once the charging is completed, the NFC chip 11 stops detuning of antenna 3a and may trigger a "wakeup" of NFC chip 12 (see FIG. 7, ref. sign S10), which then leaves the quiet mode and again enter the normal mode, in which NFC chip 12 is listening and ready to receive another request (see FIG. 7, ref. sign S1).

It is noted that the detuning of antenna 3b (see FIG. 7, ref. sign S8) is optional, in particular when the antenna 3b can be disconnected from NFC chip 12 as discussed above with reference to FIG. 4. Furthermore, it is has to be understood that NFC payment is merely an illustrative example, and the NFC chip 12 may have a different purpose or function. Similarly, the NFC chip 11 is not necessarily an NFC WLC chip but can have any other purpose or function. Irrespective of the particular function of the NFC chips 11 and 12, one NFC chip may act as "master" NFC chip and detune the antenna of the other NFC chip in order to avoid the other chip from interfering with the communication between the master NFC chip and an external NFC enabled device.

FIG. 8 illustrates another application, wherein the circuit shown in FIG. 8 (8A and 8B) is basically the same as in FIG. 4, wherein, in the present example, the NFC chip 12 may be configured as an NFC reader. The example of FIG. 8 may be used in an access control application, e.g. in a device which controls an electromechanical lock ("smart lock"), a (garage) door opener or the like. The NFC chip 12 may communicate with the controller 10 which may trigger, for example, the opening of the door, once the authentication was successful.

In the situation depicted in FIG. 8A the NFC chip 12 is configured as NFC reader which generates an NFC field via antenna 3b. In this mode of operation the NFC chip 12 controls the switch $SW_B$ to connect antenna 3b with matching network 120 and the switch $SW_A$ to detune the antenna 3a of NFC chip 11. If a user places an NFC transponder 5 close enough to the antenna 3b, NFC chip 12 and NFC transponder 5 can communicate to authenticate the owner of the NFC transponder 5. In case of a successful authentication the controller 10 may, for example, drive an electromechanical lock as mentioned above.

If the SoC (State of Charge) of the battery is too low to provide a sufficient supply voltage $V_B$, the NFC chip 12 becomes inoperative. As a consequence, the switches $SW_B$ and $SW_A$ open thus disconnecting antenna 3b and stop detuning of antenna 3a. This situation is shown in FIG. 8B. To recharge the battery 5, a user can place any suitable NFC enabled device 2 close to the antennas 3a and 3b. The NFC enabled device 2 generates an electromagnetic field which, due to the inductive coupling, induces a current in NFC antenna 3a. The NFC chip 11 can start its normal operation and initiate a charging process in accordance with the NFC WLC standard. Once the charging process is completed, the SoC of battery 5 is high enough to provide the required supply voltage VB to operate the NFC reader 12.

Figure 9:
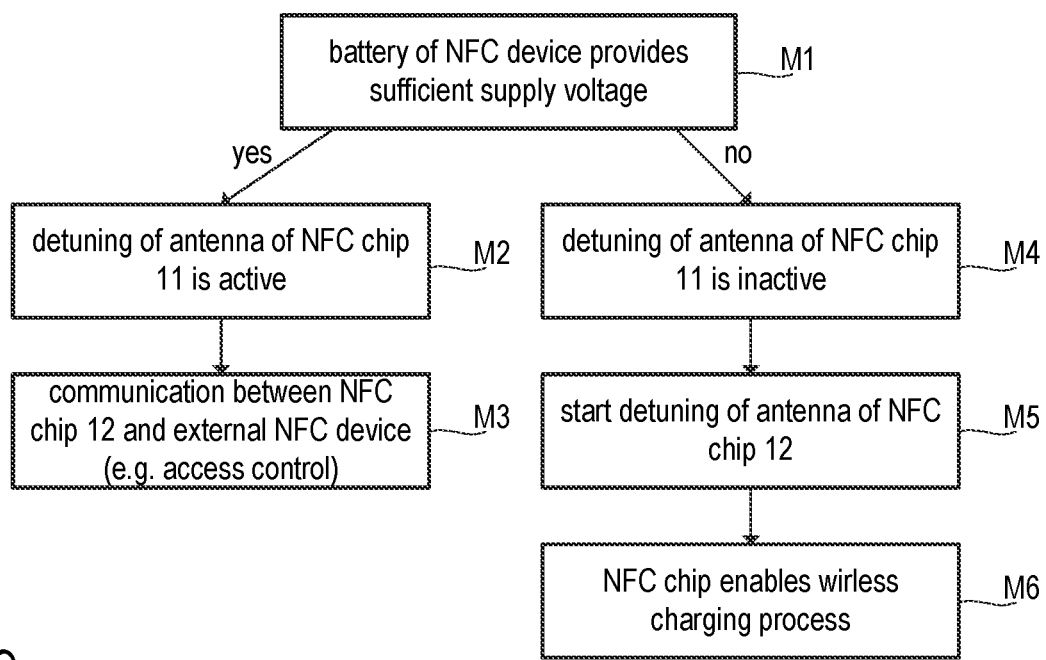
FIG. 9 is a flow chart illustrating the function of the circuit of FIG. 5.

FIG. 9 is a flow chart illustrating, by way of example, the function of the circuit of FIG. 5. The mode of operation or state of the NFC device depends on whether the battery of the NFC device provides a sufficient supply voltage (FIG. 9, box M1, see also FIG. 5, battery 5). If this is the case, the first detuning circuit (see FIG. 5, switch $SW_A$, capacitor $C_A$) for detuning the first NFC chip (see FIG. 5, NFC chip 11) is active (FIG. 9, box M2). As a consequence, a normal communication is possible between the second NFC chip (see FIG. 5, NFC chip 12) and an external NFC device (e.g. a transponder or NFC-enabled device such as a smart phone) is possible (FIG. 9, box M3), provided that the external NFC device has been placed close enough to the antennas (see FIG. 5, antennas 3a-b). Dependent on the application, this communication may be initiated by the second NFC chip (if the external NFC device is an NFC transponder/tag) or by the external NFC device. In the latter case, the second NFC chip may emulate an NFC tag as explained above.

IF the battery does not provide a sufficient supply voltage, the first detuning circuit (see FIG. 5, switch $SW_A$, capacitor $C_A$) for detuning the first NFC chip (see FIG. 5, NFC chip 11) is inactive (FIG. 9, box M4). The second NFC chip (see FIG. 5, NFC chip 12) may be inactive due to lack of supply. In response to receiving power from an external NFC enabled device (e.g. a smart phone), the first NFC chip can start detuning the antenna of the second NFC chip (FIG. 9, box M5). This detuning is optional and has basically the purpose of protection the inactive second NFC chip. The protection may also be achieved by disconnecting the antenna from the second NFC chip as shown in the examples of FIGS. 4 and 8. In some applications such a protection mechanism may not be necessary. The power received from the external NFC enabled device may be used for recharging the battery and the first NFC chip can initiate the wireless charging process (FIG. 9, box M6). Once the battery has sufficient charge and the charging process is completed, the second NFC chip 12 may become again activate (resulting in a reactivation of the first detuning circuit).

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A first NFC (Near Field Communication) device comprising:
 a first NFC antenna inductively coupled to a second NFC antenna;
 a first NFC circuit coupled to the first NFC antenna via a first matching network;
 a second NFC circuit coupled to the second NFC antenna via a second matching network;
 a first detuning circuit coupled to the first NFC antenna, the first detuning circuit operative to, when activated, detune a resonance frequency of a first resonant circuit including the first NFC antenna and the first matching network;
 wherein the second NFC circuit is operative to control activation/deactivation of the first detuning circuit; and
  wherein the second NFC circuit is operative to deactivate the first detuning circuit is inactivein response to a first condition in which when a supply voltage supplied to of the first NFC device is below a minimum supply voltage threshold.

2. The NFC device of claim 1 further comprising:
 a circuit board, on which the first NFC antenna and the second NFC antenna are arranged adjacent to each other.

3. The NFC device of claim 1,
 wherein the second NFC circuit is operative to activate the first detuning circuit in response to a second condition in which the supply voltage supplied to the NFC device is above the minimum supply voltage threshold.

4. The NFC device of claim 1,
 wherein the second NFC circuit is operative to deactivate the first detuning circuit during the first condition in which the second NFC circuit changes its mode of operation to a quiet mode, during which incoming communications received by the second antenna are ignored.

5. The NFC device of claim 1,
 wherein the second NFC circuit is operative to decouple the second NFC circuit from the second NFC antenna using a switch during the first condition in which the first detuning circuit is deactivated.

6. The NFC device of claim 1 further comprising:
 a second detuning circuit coupled to the second NFC antenna, the second detuning circuit operative to, when activated, detune a resonance frequency of a second resonant circuit including the second NFC antenna and the second matching network.

7. The NFC device of claim 6,
 wherein the first NFC circuit is operative to control activation/deactivation of the second detuning circuit.

8. The NFC device of claim 6,
wherein the first NFC circuit is operative to activate the second detuning circuit after receiving power from the first NFC antenna.

9. The NFC device of claim 6,
wherein the first NFC circuit is operative to initiate wireless charging of a battery that provides the supply voltage; and
wherein the first NFC circuit is operative to activate the second detuning circuit when starting the wireless charging process.

10. The NFC device of claim 1,
wherein the NFC device is a first NFC device;
wherein the second NFC circuit is operative to communicate with a second NFC device while the first detuning circuit is activated.

11. The first NFC device of claim 1, wherein the first detuning circuitry includes a combination of a first capacitor and a first switch coupled in series between a first node of the first matching network and a second node of the first matching network.

12. The first NFC device of claim 11, wherein the second NFC circuit is operative to control operation of the first switch.

13. The NFC device of claim 12, wherein the first detuning circuit is deactivated when the first switch is in an open state.

14. A method comprising:
detuning a resonance frequency of a first resonant circuit, the first resonant circuit including a first antenna and a first matching network of a first Near Field Communication (NFC) device, the first antenna being coupled to a first NFC circuit of the first NFC device via the first matching network;
via a second NFC circuit of the first NFC device, receiving data from a second NFC device, the data received via a second antenna coupled to the second NFC circuit via a second matching network, the first antenna and the second antenna being inductively coupled to each other; and
stopping the detuning of the resonance frequency of the first resonant circuit in response to a first condition in which a supply voltage of the first NFC device falls below a threshold value.

15. The method of claim 14 further comprising:
starting a wireless charging process, using the first NFC circuit, to recharge a battery that provides the supply voltage.

16. The method of claim 15 further comprising:
detuning a resonance frequency of a second resonant circuit including the second antenna and the second matching network in response to the first condition in which the supply voltage of the first NFC device is below the threshold value and when receiving power from an external NFC-enabled device, via the first antenna and by the first NFC circuit.

17. A Near Field Communication (NFC) device comprising:
a first NFC antenna and a second NFC antenna, the first NFC antenna inductively coupled to the second NFC antenna;
a first NFC circuit coupled to the first antenna via a first matching network;
a second NFC circuit coupled to the second antenna via a second matching network;
a first detuning circuit coupled to the first antenna, the first detuning circuit operative to, when activated, detune a resonance frequency of a first resonant circuit including the first antenna and the first matching network;
wherein the second NFC circuit is operative to control activation/deactivation of the first detuning circuit; and
wherein the second NFC circuit is operative to:
receive a wireless charging request,
transition into a quiet mode in response to receiving the wireless charging request; and
initiate a wireless charging process to charge a battery of the NFC device using power received by the first antenna.

18. The NFC device of claim 17,
wherein, in the quiet mode, an incoming communication received by the second antenna is ignored.

19. The NFC device of claim 17,
wherein, to initiate a wireless charging process, the second NFC circuit is operative to deactivate the first detuning circuit.

20. The NFC device of claim 17,
wherein, when not operating in the quiet mode, the second NFC circuit is operative to activate the first detuning circuit.

21. A method comprising:
detuning a resonance frequency of a first resonant circuit, the first resonant circuit including a first antenna and a first matching network of a first NFC (Near Field Communication) device, the first antenna being coupled to a first NFC circuit of the first NFC device via the first matching network; and
receiving data via a second antenna, the second antenna being coupled to a second NFC circuit via a second matching network, the first antenna and the second antenna being inductively coupled, the data received from a second NFC device and including a wireless charging request; and
subsequent to the including in response to the wireless charging request: i) transitioning the second NFC circuit into a quiet mode, the quiet mode including stopping the detuning of the resonance frequency of the first resonant circuit, and ii) initiating a wireless charging process to charge a battery of the first NFC device using power received by the first antenna.

22. The method of claim 21 wherein initiating the wireless charging process further includes:
detuning a resonance frequency of a second resonant circuit including the second antenna and the second matching network.

23. The method of claim 21, wherein the resonance frequency of the first resonant circuit is detuned prior to receiving the data via the second antenna.

24. The method of claim 21, wherein the first NFC circuit is operative to transmit a control signal to detune a second resonant circuit including a combination of the second antenna and the second matching network.

* * * * *